US012774761B2

(12) United States Patent
Shen et al.

(10) Patent No.: US 12,774,761 B2
(45) Date of Patent: Oct. 27, 2026

(54) VALVE AND SEALING STRUCTURE THEREOF

(71) Applicant: Danfoss A/S, Nordborg (DK)

(72) Inventors: Yanning Shen, Wuqing (CN); Long Sun, Wuqing (CN); Shuwei Liu, Wuqing (CN)

(73) Assignee: DANFOSS A/S, Nordborg (DK)

( * ) Notice: Subject to any disclaimer, the term of this patent is extended or adjusted under 35 U.S.C. 154(b) by 4 days.

(21) Appl. No.: 18/880,091

(22) PCT Filed: Jun. 7, 2023

(86) PCT No.: PCT/CN2023/098936
§ 371 (c)(1),
(2) Date: Dec. 30, 2024

(87) PCT Pub. No.: WO2024/007806
PCT Pub. Date: Jan. 11, 2024

(65) Prior Publication Data

US 2025/0347359 A1 Nov. 13, 2025

(30) Foreign Application Priority Data

Jul. 6, 2022 (CN) ......................... 202221726713.2

(51) Int. Cl.
*F16K 41/02* (2006.01)
*F16K 27/08* (2006.01)
*F16K 41/04* (2006.01)

(52) U.S. Cl.
CPC ............ *F16K 41/026* (2013.01); *F16K 27/08* (2013.01); *F16K 41/043* (2013.01)

(58) Field of Classification Search
CPC ...... F16K 41/026; F16K 41/043; F16K 27/08; F16K 41/02–023; F16K 41/046
See application file for complete search history.

(56) References Cited

U.S. PATENT DOCUMENTS 4,394,872 A 7/1983 Schobl
5,263,682 A 11/1993 Covert et al.
(Continued)

FOREIGN PATENT DOCUMENTS

CN 201925593 U 8/2011
CN 112360982 A 2/2021
CN 218118816 U 12/2022

OTHER PUBLICATIONS

International Search Report mailed Oct. 2, 2023, in connection with corresponding International Application No. PCT/CN2023/098936 (6 pp., including machine-generated English translation).
(Continued)

*Primary Examiner* — Michael R Reid
(74) *Attorney, Agent, or Firm* — McCormick, Paulding & Huber PLLC

(57) ABSTRACT

A sealing structure, including a stuffing box (2) and a valve cover (3). The side wall of the stuffing box (2) is provided with an external thread (21) and a sealing groove (22) used for mounting a first sealing ring (4); the valve cover (3) is provided with a mounting hole; when the stuffing box (2) is mounted in the mounting hole of the valve cover (3), and the stuffing box (2) and the valve cover (3) are sealed by means of the first sealing ring (4), an axial length of a connection between the external thread (21) and the valve cover (3) is L1, and a distance between a connection position of a connecting hole section (301) and a sealing hole section (302) in the mounting hole and the lower end face of the sealing groove (22) is L2, wherein L1>L2. According to the sealing structure, the risk of hurting people due to the fact that the stuffing box (2) is ejected by the residual high pressure in the valve cover (3) can be avoided, and the stuffing box can be conveniently taken down from a shaft. Also disclosed is a valve including the sealing structure.

11 Claims, 6 Drawing Sheets

(56) References Cited

U.S. PATENT DOCUMENTS

| | | | | |
|---|---|---|---|---|
| 5,375,812 | A * | 12/1994 | Kent | F16K 41/04<br>277/550 |
| 10,036,485 | B2 * | 7/2018 | Adams | F16K 31/12 |
| 11,274,765 | B2 * | 3/2022 | Riedel, Jr. | B25B 13/06 |
| 2016/0265686 | A1 | 9/2016 | Adams et al. | |

OTHER PUBLICATIONS

Extended European Search Report, issued Apr. 21, 2026, in connection with European Patent Application No. / Patent No. 23834580.5-1015 (8 pages total).

* cited by examiner

VALVE AND SEALING STRUCTURE THEREOF

CROSS-REFERENCE TO RELATED APPLICATIONS

This application is a National Stage application of International Patent Application No. PCT/CN2023/098936, filed on Jun. 7, 2023, which claims priority to Chinese Patent Application No. 202221726713.2, filed on Jul. 6, 2022, each of which are hereby incorporated by reference in their entirety.

TECHNICAL FIELD

The present application relates to the technical field of industrial valves, in particular to a packing gland, and a valve provided with the packing gland.

BACKGROUND

Valve sealing packing is sealing material packed between a valve moving component (such as a valve stem) and a valve fixed component (such as a valve fixed body). For example, cotton cloth, metal rings, asbestos, graphite and various plastics are all common materials used for valve sealing packing.

In some valve structures, a packing gland is provided between the valve stem and a valve bonnet, the packing gland being connected to the valve bonnet by a threaded connection. The following problem exists at the present time: in the process of unscrewing the packing gland from the valve bonnet, when the respective threads of the packing gland and the valve bonnet fully disengage from each other, the packing gland easily springs out under the action of residual high pressure inside the valve bonnet, so there is a risk of personal injury.

SUMMARY

To solve this problem, the present application provides a valve and a sealing structure therefor, which are able to avoid the risk of a packing gland being ejected by residual high pressure in a valve bonnet and causing personal injury.

A sealing structure, comprising a packing gland and a valve bonnet, wherein:

- a side wall of the packing gland is provided with an external thread, and a sealing groove for installing a first sealing ring;
- the valve bonnet is provided with an installation hole for installing the packing gland, the installation hole comprising a connecting hole section near an end of the valve bonnet and a sealing hole section remote from the end of the valve bonnet, the connecting hole section being provided with an internal thread adapted to the external thread, and the sealing hole section having a diameter smaller than an inner diameter of the internal thread and being adapted to the first sealing ring;
- when the packing gland is fitted into the installation hole of the valve bonnet and sealed by means of the first sealing ring, an axial length of the external thread connected to the valve bonnet is L1, and a distance between a lower end face of the sealing groove and a junction of the connecting hole section and the sealing hole section is L2, wherein L1>L2.

Optionally, in the packing gland described above, a tapered transitional face is provided at an end of the connecting hole section that is configured to join to the sealing hole section.

Optionally, in the packing gland described above, a pressure relief groove is provided on an outside face of the side wall of the packing gland that is provided with the external thread, the pressure relief groove extending in the direction toward the sealing groove to an end of the side wall on which the pressure relief groove is located.

Optionally, in the packing gland described above, the pressure relief groove is an elongated groove, having a length direction parallel to a central axis of the external thread.

Optionally, in the packing gland described above, an axial length of the pressure relief groove is L4, L1>L4 and L2>L1−L4.

A valve, comprising a shaft, a first sealing ring, and a sealing structure as described above, wherein:

- the shaft is installed within a central hole of the packing gland;
- the first sealing ring is located between the packing gland and the valve bonnet in the sealing structure, and located in the sealing groove of the packing gland.

Optionally, in the valve described above, two second sealing rings are provided in an axial direction between the shaft and the packing gland.

Optionally, the valve described above further comprises an annular spacer, the annular spacer being located at the bottom of the sealing hole section of the valve bonnet, and having an inner diameter greater than a diameter of the shaft.

Optionally, the valve is an industrial refrigeration valve.

It can be seen from the technical solutions above that in the valve and sealing structure thereof as provided in the present application, in the process of rotating the packing gland to remove it from the valve bonnet, the first sealing ring changes from a compressed state, in which it is in tight contact with an inner wall of the installation hole of the valve bonnet, to a free state in which it is in a clearance fit with the inner wall of the installation hole of the valve bonnet. That is, a sealed state between the packing gland and the valve bonnet, in which sealing is achieved by means of the first sealing ring, changes to a venting state (also called a discharge state). The first sealing ring begins to relax when it leaves the sealing position and reaches a position where the cross section of the installation hole of the valve bonnet changes (i.e. the junction of the sealing hole section and the connecting hole section in the valve bonnet), and essentially returns to the free state. At this time, since L1>L2, there is still a portion of the external thread of the packing gland that remains in connection with the internal thread of the valve bonnet. Thus, it is possible to avoid the risk of the packing gland being ejected by residual high pressure in the valve bonnet and causing personal injury. Furthermore, once the first sealing ring has left the sealing position and changed from the compressed state to the free state, the frictional force that needs to be overcome when rotating the packing gland is reduced, and thus the frictional force that needs to be overcome when pulling out the packing gland is reduced, facilitating removal of the packing gland.

BRIEF DESCRIPTION OF THE DRAWINGS

The technical solutions in embodiments of the present application are described clearly and completely below with reference to the drawings in embodiments of the present application. Obviously, the embodiments described are merely some, not all, of the embodiments of the present application. All other embodiments obtained by those skilled in the art on the basis of embodiments in the present application without inventive effort shall fall within the scope of protection of the present application.

DETAILED DESCRIPTION

The technical solutions in embodiments of the present application are described clearly and completely below with reference to the drawings in embodiments of the present application. Obviously, the embodiments described are merely some, not all, of the embodiments of the present application. All other embodiments obtained by those skilled in the art on the basis of embodiments in the present application without inventive effort shall fall within the scope of protection of the present application.

Figure 1:
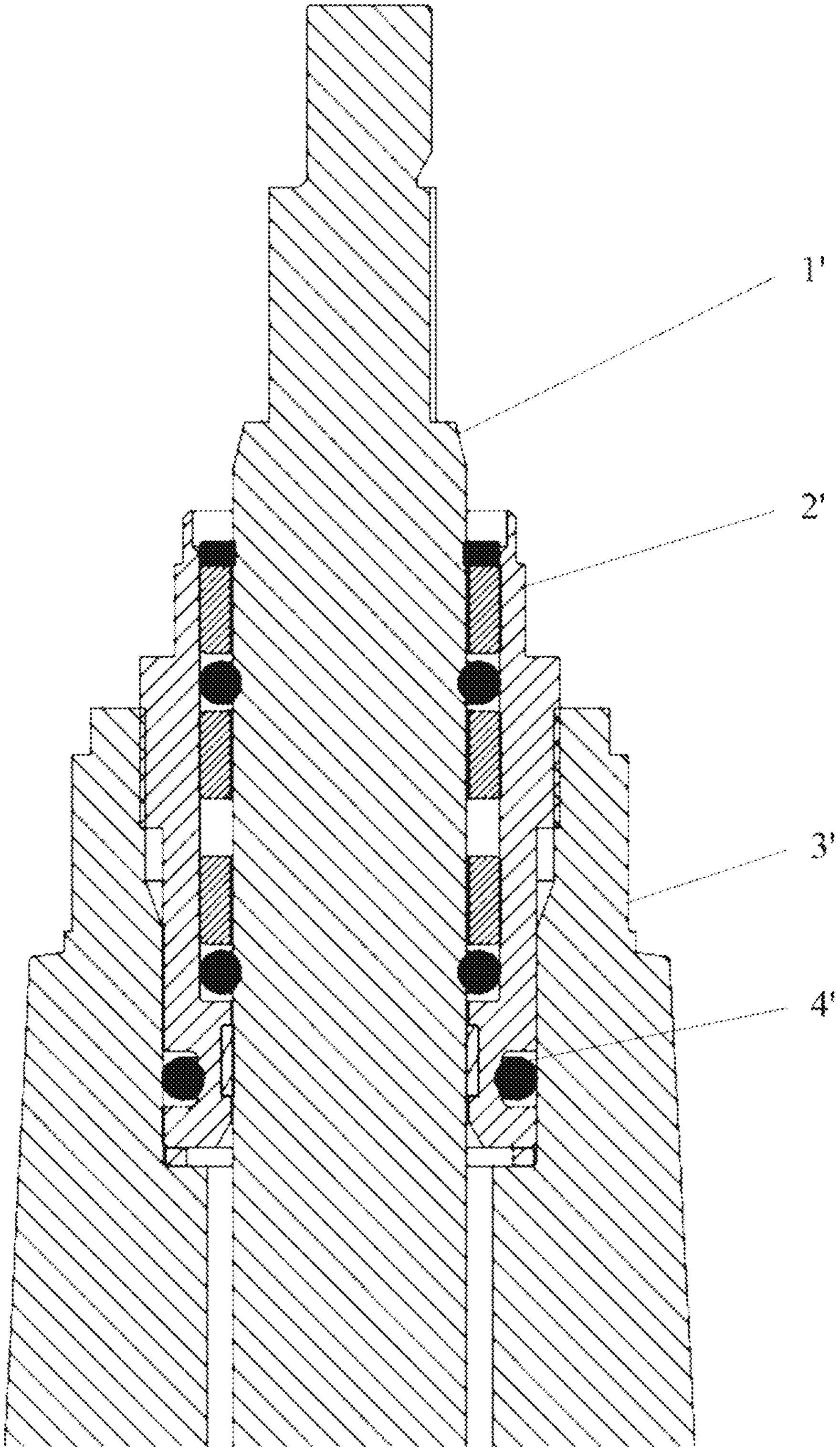
Fig.1 PRIOR ART
FIG. 1 is a sectional drawing of the assembled structure of a packing gland and a valve bonnet in a comparative solution, wherein the packing gland has been fully screwed into an installation hole of the valve bonnet.
Figure 2:
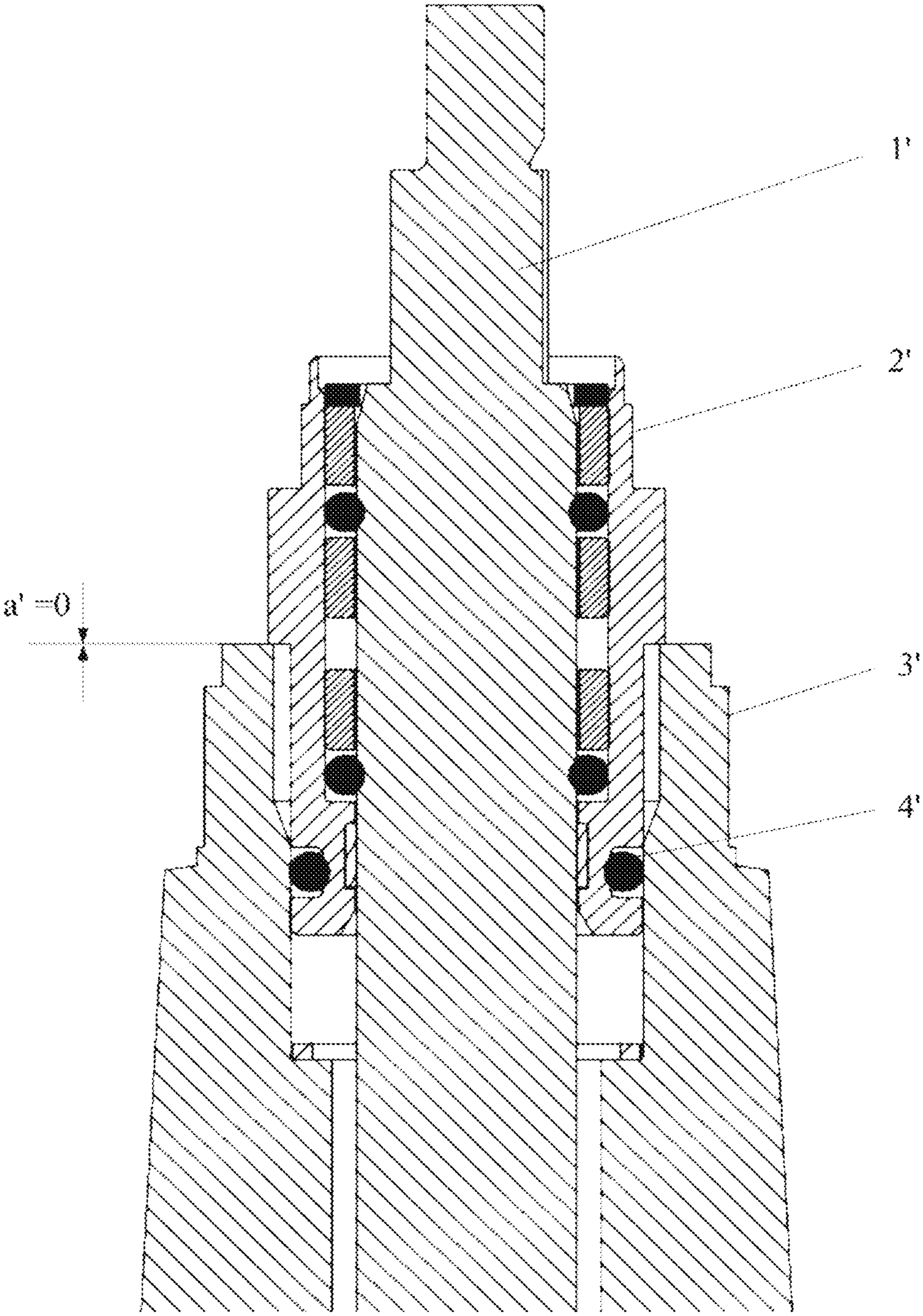
Fig.2 PRIOR ART
FIG. 2 is a sectional drawing of the assembled structure of the packing gland and the valve bonnet in the comparative solution, wherein a portion of the thread of the packing gland has been unscrewed from the installation hole of the valve bonnet.

To facilitate understanding of the technical innovations and beneficial effects of the technical solutions claimed in the present application, the present application provides a comparative solution relating to a valve structure. Referring to FIGS. 1 and 2, FIGS. 1 and 2 are sectional drawings of the assembled structure of a packing gland 2' and a valve bonnet 3' in this comparative solution. In FIG. 1, the packing gland 2' has been fully screwed into an installation hole of the valve bonnet 3'; in FIG. 2, a portion of the thread of the packing gland 2' has been unscrewed from the installation hole of the valve bonnet 3'.

Specifically referring to FIG. 1, the packing gland 2' is fitted round a valve stem 1', with a sealing/dustproof structure provided therebetween, the sealing/dustproof structure consisting of a sealing ring, a bushing and a dust ring, etc. The valve bonnet 3' is fitted round the packing gland 2', with a threaded connection and a first sealing ring 4' (generally an O-shaped sealing ring) therebetween.

Referring to FIG. 2, in the process of unscrewing the packing gland 2' from the valve bonnet 3', when the respective threads of the packing gland and the valve bonnet fully disengage from each other, the first sealing ring 4' still effects a seal between the packing gland 2' and the valve bonnet 3'. That is, when the length a of the threaded connection between the packing gland 2' and the valve bonnet 3' is equal to zero, the first sealing ring 4' just reaches, or has not yet reached, the position of a step in an inner hole of the valve bonnet 3'. At this time, the action of system pressure inside the valve bonnet 3' easily causes the packing gland 2' to spring out, causing personal injury. Thus, it can be seen that this structure has the following problems in the above scenario:

1) Since the respective threads of the packing gland 2' and the valve bonnet 3' have already fully disengaged from each other, i.e. the thread of the packing gland 2' has already been fully unscrewed from the valve bonnet 3', the entire packing gland 2' is easily ejected under the action of residual high pressure below the packing gland 2', posing a risk of personal injury.
2) Since the first sealing ring 4' still effects a seal between the packing gland 2' and the valve bonnet 3', both the packing gland 2' and the valve bonnet 3' are in tight contact with the first sealing ring 4' at this time, so when the packing gland 2' is pulled out of the valve bonnet 3', the frictional force that needs to be overcome is quite large, and it is difficult to pull the packing gland 2' out of the valve bonnet 3'.

Referring to FIGS. 3-6, particular embodiments of the present application provide a sealing structure, comprising a packing gland 2 and a valve bonnet 3, wherein:

a side wall of the packing gland 2 is provided with an external thread 21, and a sealing groove 22 for installing a first sealing ring 4;

the valve bonnet 3 is provided with an installation hole for installing the packing gland 2, the installation hole comprising a connecting hole section 301 near an end of the valve bonnet and a sealing hole section 302 remote from the end of the valve bonnet, the connecting hole section 301 being provided with an internal thread adapted to the external thread 21 of the packing gland 2, and the sealing hole section 302 having a diameter smaller than an inner diameter of the internal thread and being adapted to the first sealing ring 4.

Figure 3:
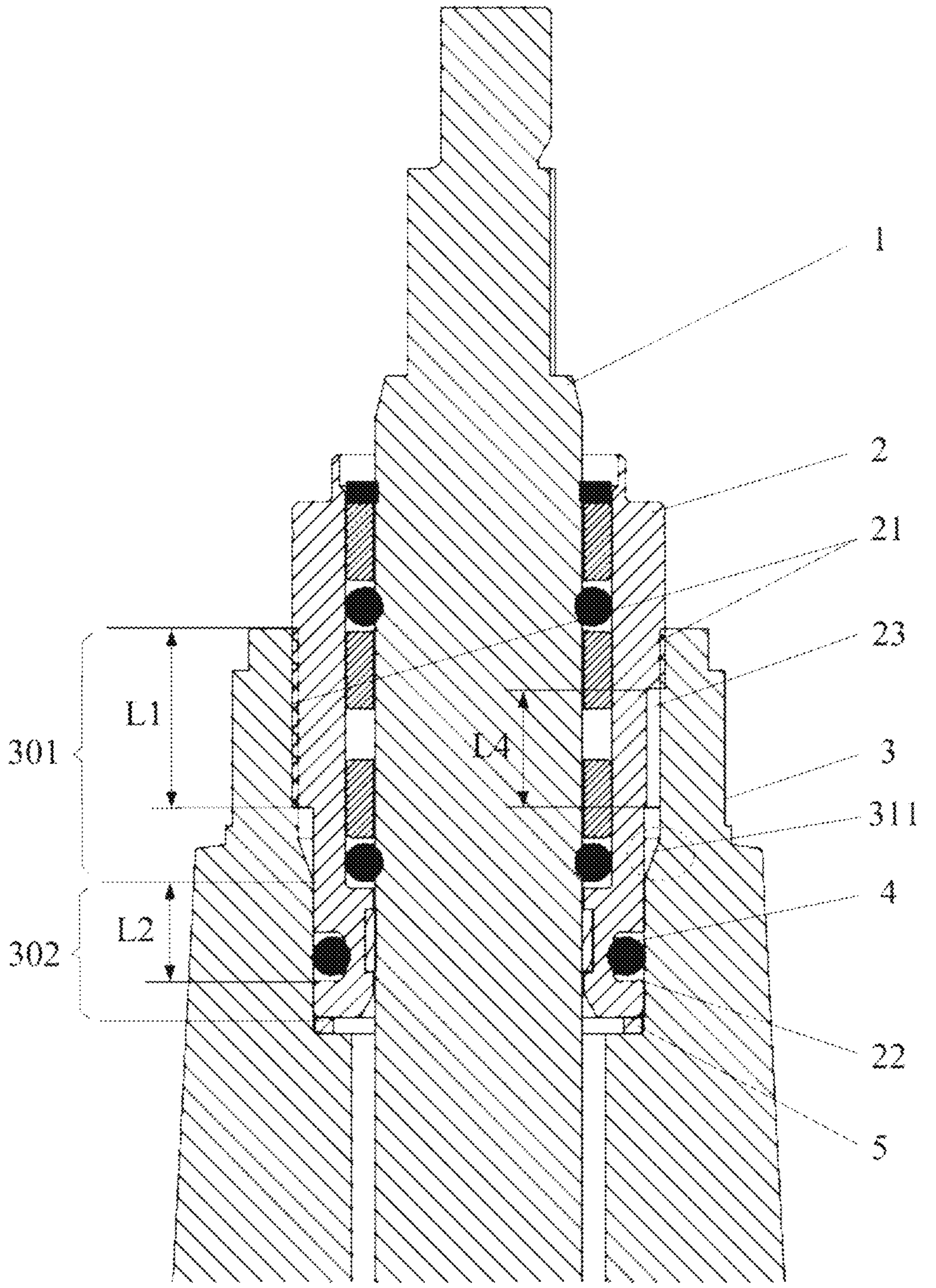
FIG. 3 is a sectional drawing of the assembled structure of a packing gland and a valve bonnet in an embodiment of the present application, wherein the packing gland has been fully screwed into an installation hole of the valve bonnet.

When the packing gland 2 is fitted into the installation hole of the valve bonnet 3 and sealed by means of the first sealing ring 4, an axial length of the external thread 21 of the packing gland 2 connected to the internal thread of the valve bonnet 3 is set as L1, and a distance between a lower end face of the sealing groove 22 and the junction of the connecting hole section 301 and the sealing hole section 302 is set as L2; as shown in FIG. 3, the lower end face of the sealing groove 22 is a side face of the sealing groove 22 remote from the end of the valve bonnet. At this time, the following condition should be satisfied: $L1>L2$, i.e. $L1-L2>0$.

Figure 4:
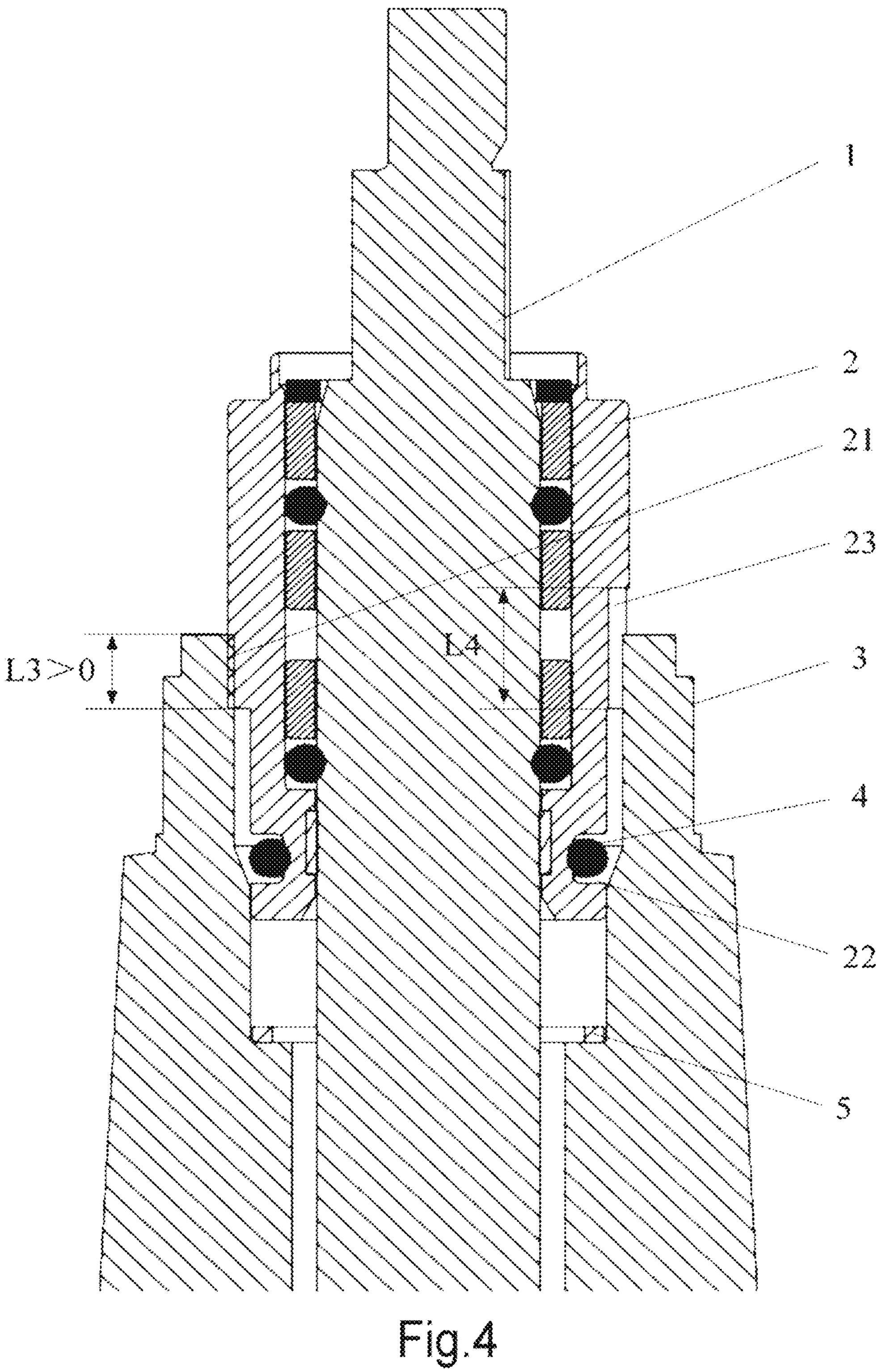
FIG. 4 is a sectional drawing of the assembled structure of the packing gland and the valve bonnet in an embodiment of the present application, wherein a portion of the thread of the packing gland has been unscrewed from the installation hole of the valve bonnet.
Figure 5:
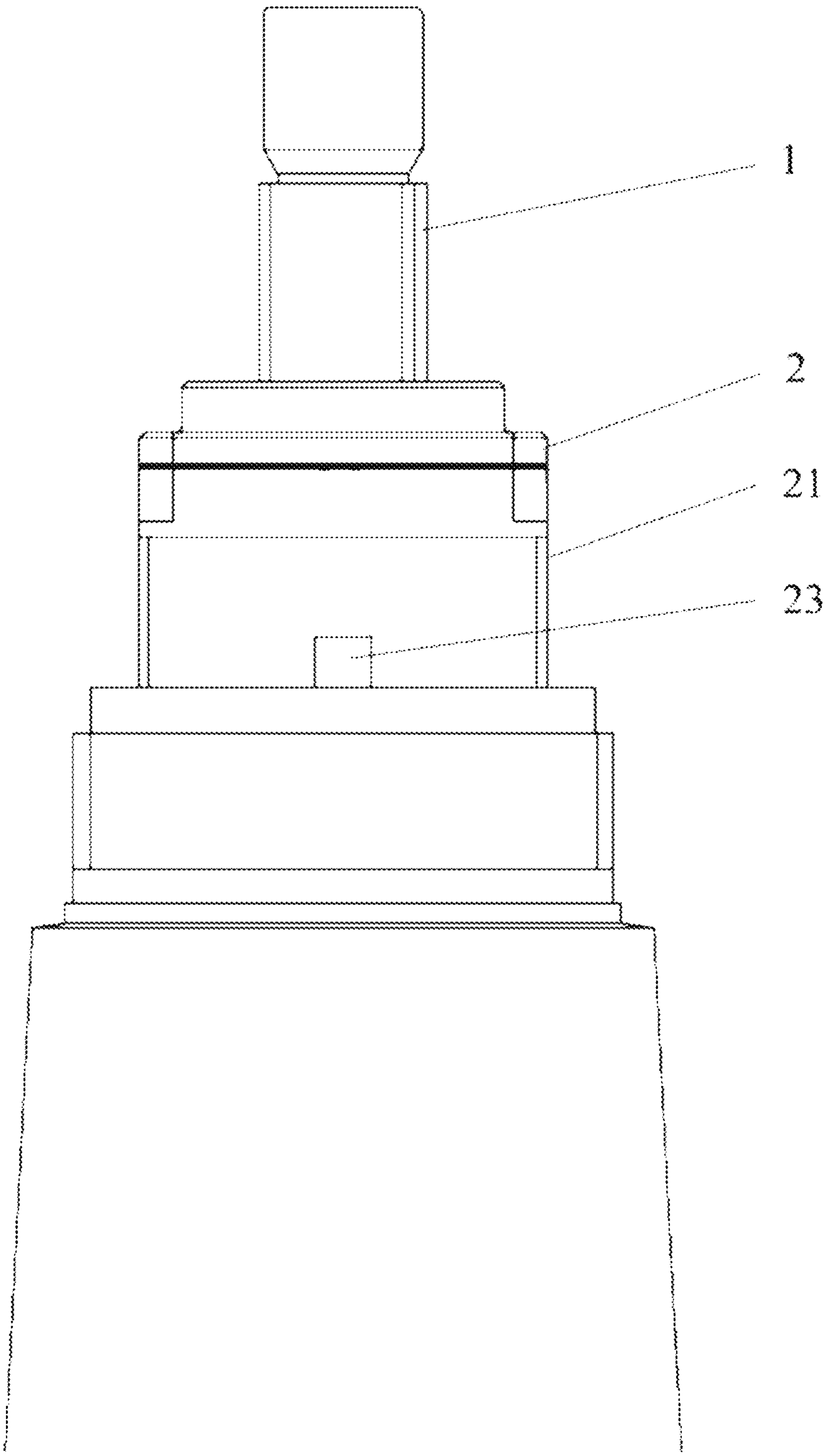
FIG. 5 is a side view of the assembled structure of the packing gland and the valve bonnet in FIG. 4.
Figure 6:
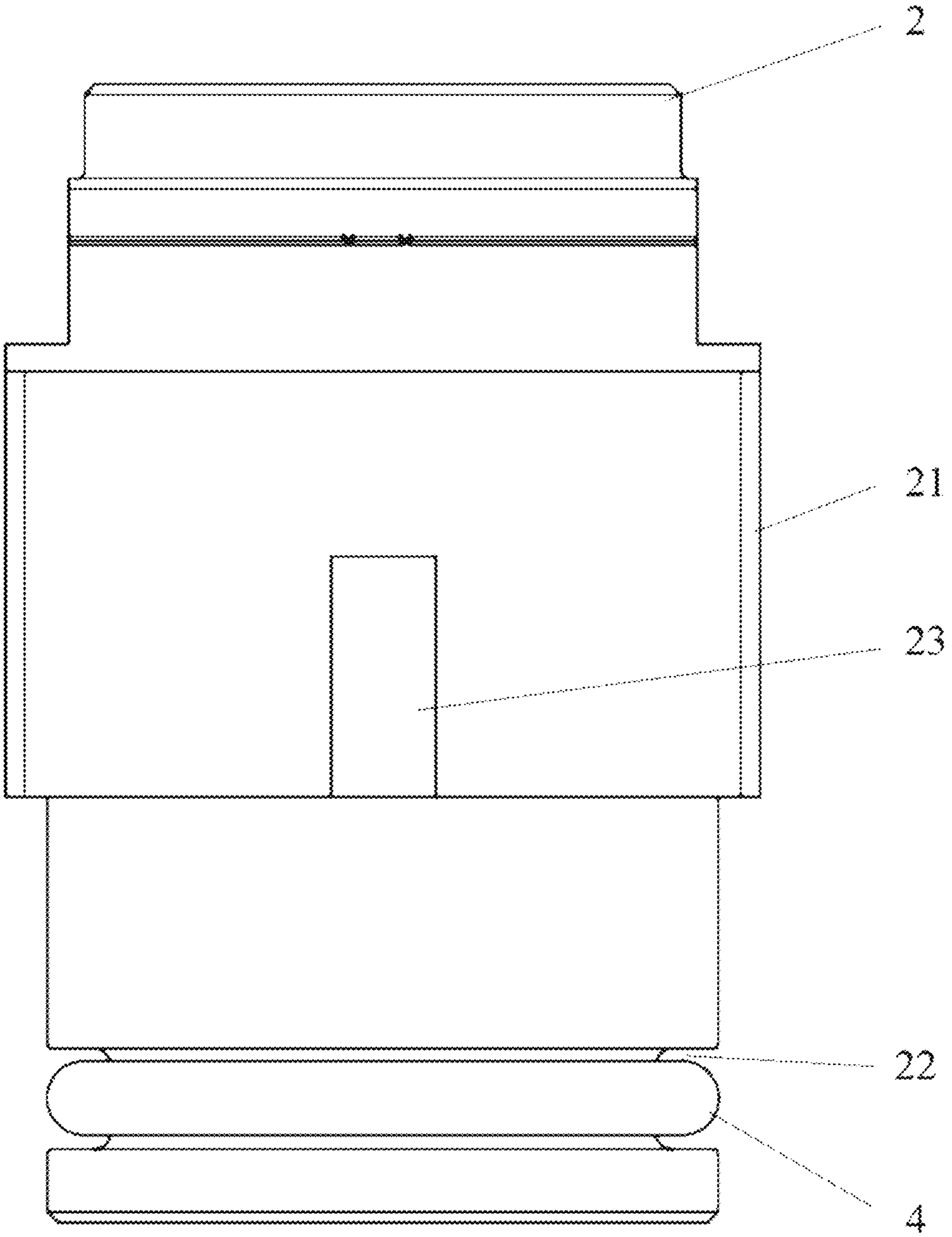
FIG. 6 is a side view of the packing gland in an embodiment of the present application.

In the process of rotating the packing gland 2 to remove it from the valve bonnet 3, the first sealing ring 4 changes from a compressed state, in which it is in tight contact with an inner wall of the installation hole of the valve bonnet 3, to a free state in which it is in a clearance fit with the inner wall of the installation hole of the valve bonnet 3. That is, a sealed state between the packing gland 2 and the valve bonnet 3 as shown in FIG. 3, in which sealing is achieved by means of the first sealing ring 4, changes to a venting state (also called a discharge state) as shown in FIG. 4. Referring to FIG. 4, the first sealing ring 4 begins to relax when it leaves the sealing position and reaches a position where the cross section of the installation hole of the valve bonnet 3 changes (i.e. the junction of the sealing hole section 302 and the connecting hole section 301 in FIG. 3), and essentially returns to the free state. At this time, since $L1>L2$, i.e. the difference L3 between L1 and L2 is >0, there is still a portion of the external thread 21 of the packing gland 2 that remains in connection with the internal thread of the valve bonnet 3. Thus, it is possible to avoid the risk of the packing gland 2 being ejected by residual high pressure in the valve bonnet 1 and causing personal injury. Furthermore, once the first sealing ring 4 has left the sealing position and changed from the compressed state to the free state, the frictional force that needs to be overcome when rotating the packing gland 2 is reduced, and thus the frictional force that needs to be overcome when pulling out the packing gland 2 is reduced, facilitating removal of the packing gland 2.

By way of comparison, referring to FIG. 2, in the comparative solution, when the first sealing ring 4' leaves the sealed state, a length a' of thread connection between the packing gland 2' and the valve bonnet 3' is equal to zero, so there is a risk of the packing gland 2' springing out and causing personal injury.

In a particular implementation, referring to FIG. 3, a tapered transitional face 311 is provided at an end of the connecting hole section 301 in the valve bonnet 3 that is configured to join to the sealing hole section 302, thus facilitating fitting of the packing gland 2 into the installation hole of the valve bonnet 3.

Further, referring to FIGS. 3-6, one or more pressure relief groove 23 is provided on an outside face of the side wall of the packing gland 2 that is provided with the external thread 21; the pressure relief groove 23 extends in the direction toward the sealing groove 22 to an end of the side wall on which the pressure relief groove is located. Thus, when removing the packing gland 2, residual high pressure in the valve bonnet 3 can be relieved by means of the pressure relief groove 23, further avoiding the risk of the packing gland 2 springing out.

In a particular implementation, referring to FIGS. 3 and 4, if the axial length of the pressure relief groove 23 is L4, the following conditions must be satisfied: L1>L4 and L2>L1−L4, so as to ensure that when the packing gland 2 is unscrewed, causing a portion of the pressure relief groove 23 to be exposed outside the valve bonnet 3, the respective threads of the packing gland 2 and the valve bonnet 3 are still in a partially engaged state. Thus, in the process of removing the packing gland 2 from the valve bonnet 3, when the first sealing ring 4 leaves the sealing position and changes from the compressed state to the free state, and the respective threads of the packing gland 2 and the valve bonnet 3 are still in a partially engaged state, residual pressure in the valve bonnet 3 below the packing gland 2 can be released through the pressure relief groove 23, thereby eliminating the danger of the packing gland being ejected by residual pressure and causing personal injury.

In a particular implementation, the pressure relief groove 23 is an elongated groove, having a length direction parallel to a central axis of the external thread 21. However, there is no limitation to this; in other particular embodiments, the pressure relief groove 23 may be configured as a structure that is inclined relative to an axis of the valve stem, or as another curved structure, in each case being able to achieve the abovementioned pressure relief effect.

In summary, embodiments of the present application further provide a valve, provided with the sealing structure described above. Specifically referring to FIGS. 3-6, the valve comprises a shaft 1, the packing gland 2, the valve bonnet 3 and the first sealing ring 4. Wherein, the shaft 1 is installed within a central hole of the packing gland 2; the packing gland 2 is installed within the installation hole of the valve bonnet 3, and in threaded connection therewith; the first sealing ring 4 is located between the packing gland 2 and the valve bonnet 3 in the sealing structure, and located in the sealing groove 22 of the packing gland 2.

In a particular implementation, two second sealing rings are provided in an axial direction between the shaft 1 and the packing gland 2; this is a double O-ring design, which can improve sealing of the packing gland at low temperatures.

In a particular implementation, an annular spacer 5 is further provided in the valve described above, the annular spacer 5 being located at the bottom of the sealing hole section 302 of the valve bonnet 3, and having an inner diameter greater than a diameter of the shaft 1.

In a particular embodiment, the valve may be an industrial refrigeration valve. However, there is no limitation to this; the sealing structure described above is also suitable for use in valves in other fields, and those skilled in the art may design specific details according to actual needs.

Finally, it should further be explained that relationship terms such as "first" and "second" as used herein are merely intended to distinguish one entity or operation from another entity or operation, and do not necessarily require or imply the existence of any such actual relationship or order between these entities or operations. Moreover, the term "comprises", "includes" or any other variant thereof is intended to encompass non-exclusive inclusion, so that a process, method, article or device which comprises a series of key elements does not comprise these key elements alone, but also comprises other key elements which are not listed explicitly, or also comprises key elements which are intrinsic to such a process, method, article or device. In the absence of further restriction, in the case of a key element defined by the phrase "comprises a . . . ", the existence of another, identical key element in the process, method, article or device comprising said key element is not ruled out.

The embodiments herein are described in a progressive manner, and the emphasis of each embodiment is to describe differences from other embodiments. For parts in different embodiments that are the same or similar, the corresponding embodiment may be referred to.

The above description of disclosed embodiments will enable those skilled in the art to implement or use the present application. Various modifications to these embodiments will be obvious to those skilled in the art, and the general principles defined herein may be realized in other embodiments without departing from the spirit or scope of the present application. Thus, the present application will not be restricted to the embodiments disclosed herein, but shall conform to the broadest scope consistent with the principles and novel characteristics disclosed herein.

What is claimed is:

1. A sealing structure, comprising a packing gland and a valve bonnet, wherein:

a side wall of the packing gland is provided with an external thread, and a sealing groove;

the valve bonnet is provided with an installation hole for installing the packing gland, the installation hole comprising a connecting hole section near an end of the valve bonnet and a sealing hole section remote from the end of the valve bonnet, the connecting hole section being provided with an internal thread adapted to the external thread, and the sealing hole section having a diameter smaller than an inner diameter of the internal thread; and when the packing gland is fitted into the installation hole of the valve bonnet and sealed at the sealing groove, an axial length of the external thread connected to the valve bonnet is L1, and a distance between a lower end face of the sealing groove and a junction of the connecting hole section and the sealing hole section is L2, wherein L1>L2;

wherein a pressure relief groove is provided on an outside face of the side wall of the packing gland that is provided with the external thread, the pressure relief groove extending in the direction toward the sealing groove to an end of the side wall on which the pressure relief groove is located.

2. The sealing structure as claimed in claim 1, wherein a tapered transitional face is provided at an end of the connecting hole section that is configured to join to the sealing hole section.

3. The sealing structure as claimed in claim 1, wherein the pressure relief groove is an elongated groove, having a length direction parallel to a central axis of the external thread.

4. The sealing structure as claimed in claim 1, wherein an axial length of the pressure relief groove is L4, L1>L4 and L2>L1-L4.

5. A valve, comprising a shaft, a first sealing ring, and the sealing structure as claimed in claim 1, wherein:

the shaft is installed within a central hole of the packing gland;

the first sealing ring is located between the packing gland and the valve bonnet in the sealing structure, and located in the sealing groove of the packing gland.

6. The valve as claimed in claim 5, wherein two second sealing rings are provided in an axial direction between the shaft and the packing gland.

7. The valve as claimed in claim 5, further comprising an annular spacer, the annular spacer being located at the bottom of the sealing hole section of the valve bonnet, and having an inner diameter greater than a diameter of the shaft.

8. The valve as claimed in claim 5, wherein the valve is an industrial refrigeration valve.

9. A valve, comprising a shaft, a first sealing ring, and the sealing structure as claimed in claim 2, wherein:

the shaft is installed within a central hole of the packing gland;

the first sealing ring is located between the packing gland and the valve bonnet in the sealing structure, and located in the sealing groove of the packing gland.

10. A valve, comprising a shaft, a first sealing ring, and the sealing structure as claimed in claim 3, wherein:

the shaft is installed within a central hole of the packing gland;

the first sealing ring is located between the packing gland and the valve bonnet in the sealing structure, and located in the sealing groove of the packing gland.

11. A valve, comprising a shaft, a first sealing ring, and the sealing structure as claimed in claim 4, wherein:

the shaft is installed within a central hole of the packing gland;

the first sealing ring is located between the packing gland and the valve bonnet in the sealing structure, and located in the sealing groove of the packing gland.

* * * * *